(12) United States Patent
Aoki

(10) Patent No.: US 9,412,014 B2
(45) Date of Patent: Aug. 9, 2016

(54) BIOMETRIC INFORMATION PROCESS DEVICE, BIOMETRIC INFORMATION PROCESS METHOD, AND COMPUTER READABLE MEDIUM

(75) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 607 days.

(21) Appl. No.: 13/428,387

(22) Filed: Mar. 23, 2012

(65) Prior Publication Data

US 2012/0307031 A1 Dec. 6, 2012

(30) Foreign Application Priority Data

May 30, 2011 (JP) ................... 2011-120531

(51) Int. Cl.
*H04N 9/47* (2006.01)
*H04N 7/18* (2006.01)
*G06K 9/00* (2006.01)
*G06K 9/46* (2006.01)

(52) U.S. Cl.
CPC ........ *G06K 9/00382* (2013.01); *G06K 9/00926* (2013.01); *G06K 9/4661* (2013.01); *G06K 2009/0006* (2013.01)

(58) Field of Classification Search
CPC ..................... G06K 9/00006; G07C 9/00158
USPC .............................................. 348/77, E7.085
See application file for complete search history.

(56) References Cited

U.S. PATENT DOCUMENTS

| | | | |
|---|---|---|---|
| 7,800,643 B2 | 9/2010 | Hama | |
| 2002/0141620 A1* | 10/2002 | Monden | ............. G06K 9/00067 382/115 |
| 2005/0105078 A1* | 5/2005 | Carver | ............... G06K 9/00046 356/71 |
| 2005/0226467 A1 | 10/2005 | Hatano et al. | |
| 2009/0243798 A1* | 10/2009 | Fukuda et al. | ............... 340/5.82 |
| 2012/0082348 A1* | 4/2012 | Fukuda et al. | ................ 382/115 |

FOREIGN PATENT DOCUMENTS

| | | |
|---|---|---|
| EP | 1903509 A1 | 3/2008 |
| JP | 10-162146 A | 6/1998 |
| JP | 2001-167252 A | 6/2001 |
| JP | 2002-501265 | 1/2002 |
| JP | 2002-112970 | 4/2002 |
| JP | 2002-514098 | 5/2002 |
| JP | 2002-200050 | 7/2002 |
| JP | 2004-30564 A | 1/2004 |
| JP | 2004-178134 A | 6/2004 |

(Continued)

OTHER PUBLICATIONS

Extended European Search Report dated Sep. 19, 2012 for corresponding European Application No. 12160725.3.

(Continued)

*Primary Examiner* — Hung Dang
*Assistant Examiner* — Girumsew Wendmagegn
(74) *Attorney, Agent, or Firm* — Fujitsu Patent Center

(57) ABSTRACT

A biometric information process device includes: a biometric sensor obtaining a plurality of biometric images of a user; a detection portion detecting a surface reflection region of the plurality of biometric images; and a storage portion storing biometric information obtained from biometric images included in the plurality of biometric images, the biometric images having a different surface reflection region from each other.

16 Claims, 15 Drawing Sheets

(56) References Cited

FOREIGN PATENT DOCUMENTS

| | | | |
|---|---|---|---|
| JP | 2006-287689 A | 10/2006 | |
| JP | 2007-010346 | 1/2007 | |
| JP | 2007-323667 | 12/2007 | |
| JP | 2008-21072 A | 1/2008 | |
| JP | 2008-225970 | 9/2008 | |
| JP | 2009-077930 | 4/2009 | |
| JP | 2010-277315 A | 12/2010 | |
| WO | WO-98/08439 | 3/1998 | |
| WO | WO-99/38121 | 7/1999 | |
| WO | WO-2010/032126 A2 | 3/2010 | |
| WO | WO 2010/146675 A1 * | 12/2010 | ............ G06T 7/00 |
| WO | 2011061940 A1 | 5/2011 | |

OTHER PUBLICATIONS

Cross, J. M. et al., "Thermographic Imaging of the Subcutaneous Vascular Network of the Back of the Hand for Biometric Identification," Security Technology, Proceedings, Institute of Electrical and Electronics Engineers 29th Annual 1995 International Carnahan Conference of Sanderstead, UK, Oct. 18-20, 1995, pp. 20-35, XP010196386.

Methani, C. et al., "Camera Based Palmprint Recognition," International Institute of Information Technology, India, Aug. 1, 2010, retrieved on Sep. 6, 2012 from internet: URL:http://cvit.iiit.ac.in/thesis/chhayaMS2010/Downloads/Chhaya_Thesis2010.pdf, pp. 1-91, XP55037400.

Rakshit, S. et al., "Iris image selection and localization based on analysis of specular reflection," Signal Processing Applications for Public Security and Forensics, Safe '07, Apr. 11, 2007, retrieved on Sep. 11, 2012 from the internet: URL:http://ieeeplore.ieee.org/xpls/abs_all.jsp?arnumber=4218945&tag=1, XP55037756, 4 pages.

Japanese Office Action issued Dec. 9, 2014 for corresponding Japanese Patent Application No. 2011-120531, with Partial English Translation, 5 pages.

* cited by examiner

FIG. 4A
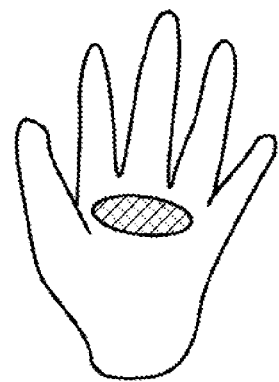
REGISTERED IMAGE 1
FIG. 4B
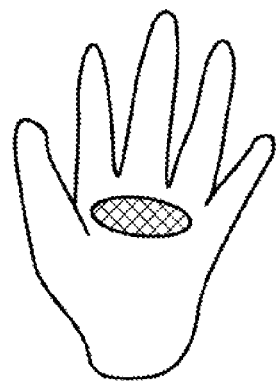
REGISTERED IMAGE 2
FIG. 4C
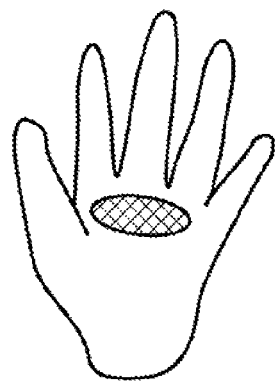
REGISTERED IMAGE 3
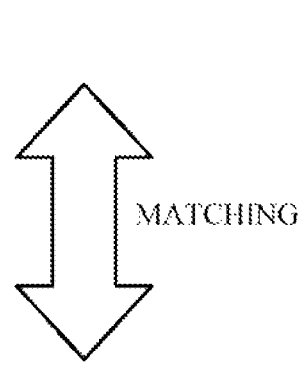
MATCHING
FIG. 4D
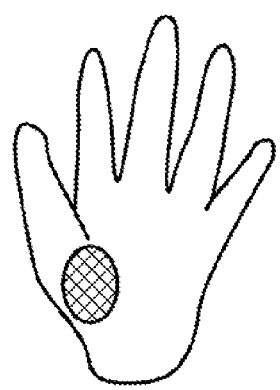
IMAGE FOR MATCHING FIG. 5A
FIG. 5B
FIG. 5C
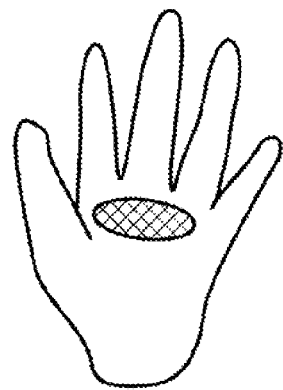
REGISTERED IMAGE 1
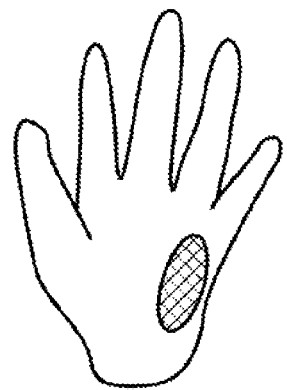
REGISTERED IMAGE 2
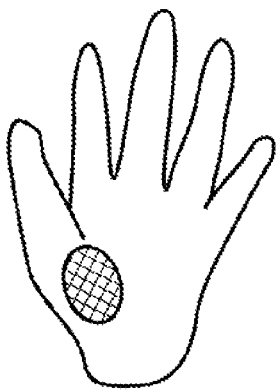
REGISTERED IMAGE 3
MATCHING
FIG. 5D
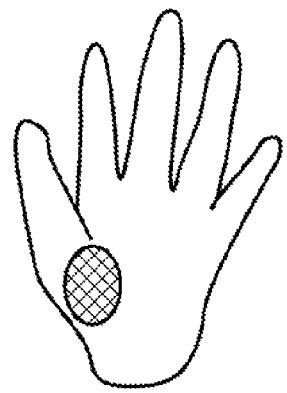
IMAGE FOR MATCHING $$R_{n,m} \equiv \frac{S_n \cap S_m}{S_n \cup S_m}$$

FIG. 14

| ID | REGISTRATION No. | REGISTERED FEATURE DATA | SURFACE REFLECTION REGION INFORMATION | DISTANCE AT REGISTRATION | POSITION AT REGISTRATION |
|---|---|---|---|---|---|
| 001 | 1 | xxx... | S1={0,0,1,...} | 5.5 | (-1,5) |
| | 2 | xxx... | S2={0,0,0,...} | 4.0 | (3,-9) |
| | 3 | xxx... | S3={0,1,0,...} | 4.3 | (5,-5) |
| 002 | 1 | xxx... | S1={0,0,0,...} | 5.1 | (-1,5) |
| | 2 | xxx... | S2={0,0,0,...} | 5.8 | (3,-9) |
| | 3 | xxx... | S2={0,1,0,...} | 4.3 | (4,-7) |

BIOMETRIC INFORMATION PROCESS DEVICE, BIOMETRIC INFORMATION PROCESS METHOD, AND COMPUTER READABLE MEDIUM

CROSS-REFERENCE TO RELATED APPLICATION

This application is based upon and claims the benefit of priority of the prior Japanese Patent Application No. 2011-120531, filed on May 30, 2011, the entire contents of which are incorporated herein by reference.

FIELD

A certain aspect of embodiments described herein relates to a biometric information process device, a biometric information process method, and a computer readable medium.

BACKGROUND

There are a method of using a transmitted light, a method of using a reflected light and so on, as a method of taking an image of a biological body in a biometric authentication. In a case where an image of a biological body under a skin such as a vein is taken, a diffusion light that is included in a reflected light, diffuses inside of a palm and returns is used. In this case, a surface reflection light reflecting at the skin is a noise. Therefore, when the surface reflection light and the diffusion light are superpositioned with each other, detecting of a biological body is difficult.

The following technologies are known as a method of taking an image without the surface reflection. In Japanese Patent Application Publication No. 2002-200050 (hereinafter referred to as Document 1), surface reflection is removed with use of a polarization filter. In Japanese Patent Application Publication No. 2002-514098 (hereinafter referred to as Document 2), a surface reflection component is removed by controlling "on" and "off" of a plurality of light sources.

SUMMARY

According to an aspect of the present invention, there is provided a biometric information process device comprising: a biometric sensor obtaining a plurality of biometric images of a user; a detection portion detecting a surface reflection region of the plurality of biometric images; and a storage portion storing biometric information obtained from biometric images included in the plurality of biometric images, the biometric images having a different surface reflection region from each other.

According to an aspect of the present invention, there is provided a biometric information process method comprising: obtaining a plurality of biometric images of a user with a biometric sensor; detecting a surface reflection region of the plurality of biometric images; and storing biometric information obtained from biometric images included in the plurality of biometric images, the biometric images having a different surface reflection region from each other.

According to an aspect of the present invention, there is provided a computer readable, non-transitory medium storing a program that causes a computer to execute a process, the process including: obtaining a plurality of biometric images of a user with a biometric sensor; detecting a surface reflection region of the plurality of biometric images; and storing biometric information obtained from biometric images included in the plurality of biometric images, the biometric images having a different surface reflection region from each other.

BRIEF DESCRIPTION OF DRAWINGS

FIG. 4A to FIG. 4C illustrate a plurality of registered images;
FIG. 4D illustrates an image for matching;
FIG. 5A to FIG. 5C illustrate a plurality of registered images;
FIG. 5D illustrates an image for matching;
FIG. 14 illustrates a table for describing an example of a registered data.

DESCRIPTION OF EMBODIMENTS

In the technology of Document 1, there is a problem that the polarization filter is expensive. In particular, there are few polarization filters covering a wavelength of a near-infrared light. Therefore, the polarization filters are expensive. And it is necessary to emit an own light through the polarization filter. Therefore, in general, there is a problem that an amount of an emitting light is reduced to half or less. With the technology of Document 2, a device needs a given size. That is, it is necessary to make a difference between incoming angles of surface reflections. Therefore, the necessity is against the downsizing of a biometric authentication device.

Figure 1:
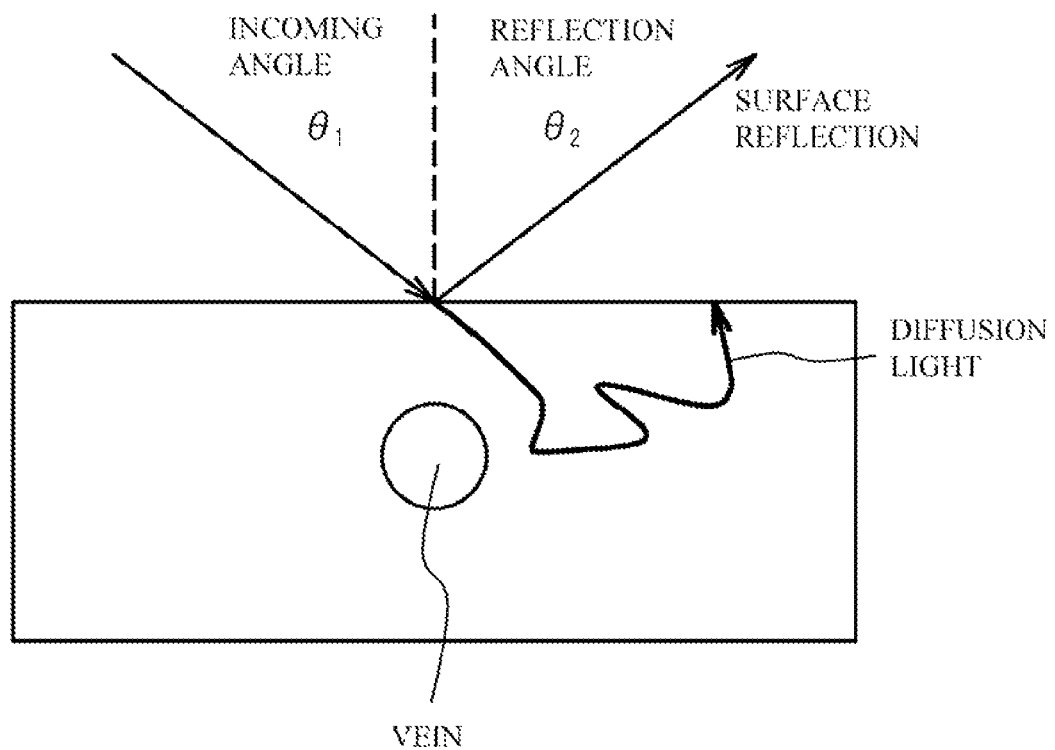
FIG. 1 illustrates surface reflection.

A description will be given of biometric authentication using a reflection light before embodiments. A description will be given of a vein authentication as an example. The vein authentication adopts an authentication method in which an image of a vein under a skin is taken with use of a light source of near-infrared light. As illustrated in FIG. 1, a light emitted to a skin is divided into two reflection components including a diffusion light and a surface reflection light.

The diffusion light is a light transmitted and diffused to under a skin. That is, a light entering under a skin repeats scattering, reaches a skin surface, and is output finally as the diffusion light. The diffusion light has some information of a vein under a skin and is used as an effective reflection light in the vein authentication.

A surface reflection light is a reflection light that is produced at an interface between an air and a skin at a given rate because of a refraction index difference between a refraction index of the air and that of the skin. The reflection direction and the intensity of the surface reflection light are determined by an incoming angle of a light and a refraction index (refraction index of the air and a biological body) (Snell's law/Fresnel's law). When a surface of an object is flat, a surface reflection light is obtained only in a direction of a reflection angle θ2 that is the same as an incoming angle θ1. However, when the surface of the object is not flat as in the case of a biological body, the surface reflection light is observed in a range broadened to some extent. The surface reflection light is a noise that is unnecessary for a vein image.

Figure 2A:
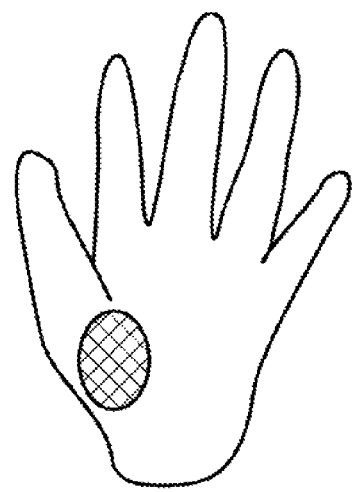
FIG. 2A to FIG. 2C illustrate surface reflection.
Figure 2B:
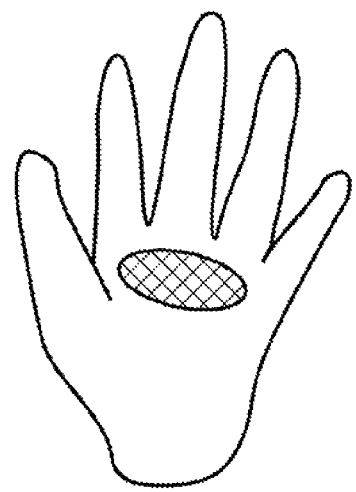
Figure 2C:
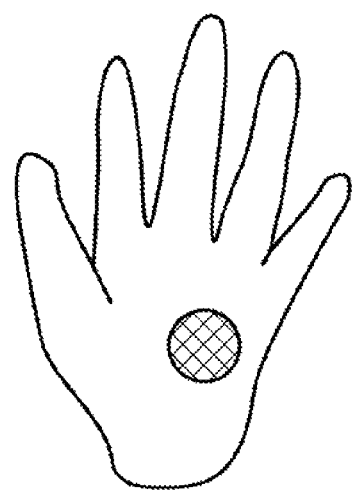

A reflection angle of a surface reflection depends on an incoming angle with respect to an object. Therefore, when the object has a concavity and a convexity as in the case of a palm, a region in which much surface reflection appears (hereinafter referred to as a surface reflection region) may occur dependently on a condition of an incoming light. The surface reflection region is determined dependently on a distance, a position, an angle or the like of the object. Therefore, the surface reflection region may occur at various positions of the palm, as illustrated in FIG. 2A to FIG. 2C. In the cases of FIG. 2A to FIG. 2C, a shaded region is the surface reflection region. It is difficult to take a distinct vein image in the surface reflection region. This is because a surface pattern such as a wrinkle or a wound overlaps with a vein. In this case, authentication accuracy may be degraded.

The following technology may be used as an imaging method removing the surface reflection. For example, it is thought that the surface reflection is removed with use of a polarization filter. The polarization filter is a filter dividing a light into a P-wave and a S-wave. By using of the polarization filter, the surface reflection can be removed with use of a reflectivity difference between the P-wave and the S-wave. However, there is a problem that the polarization filter is expensive. In particular, there are few polarization filters covering a wavelength of a near-infrared light. Therefore, the polarization filters are more expensive. And it is necessary to emit an own light through the polarization filter. Therefore, in general, there is a problem that an amount of an emitting light is reduced to half or less.

Figure 3:
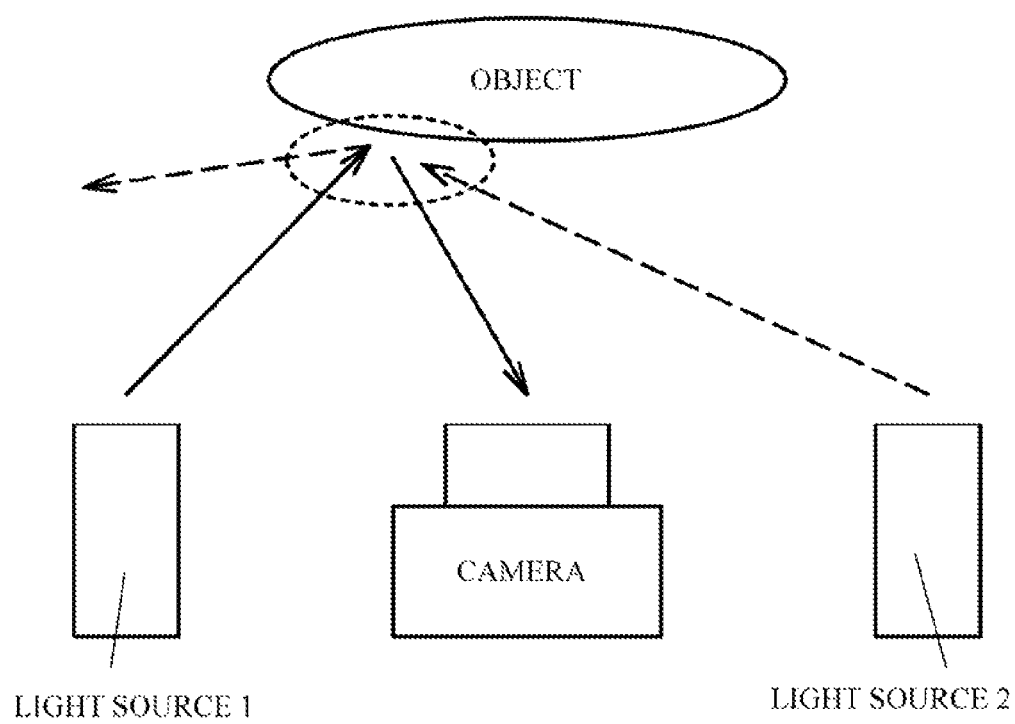
FIG. 3 illustrates a positional relationship between an object and a light source.

The reflection direction of the surface reflection is determined by an incoming angle of a light. Therefore, when there are a plurality of light sources, the occurrence positions of the surface reflection are changed according to the positions of the light sources. And so, an image of which surface reflection region is removed can be generated when "ON" and "OFF" of the plurality of the light sources are controlled individually and an image is taken. However, when the method is used, a device gets larger. That is, as illustrated in FIG. 3, a given space is needed, when light sources are located at a plurality of positions in order to make a difference between incoming angles of the surface reflection.

In the following embodiments, a description will be given of a biometric information process device, a biometric information process method and a biometric information process program that restrain a device cost and a cost and improves the authentication accuracy, with reference to drawings.

First, an outline is described. FIG. 4A to FIG. 4C illustrate a plurality of registered images 1 to 3. FIG. 4D illustrates an image for matching. The registered image is a biometric image of a specific user registered in a database in advance. The image for matching is a biometric image for matching obtained from an image of a biological body of the user obtained through a biometric sensor. The examples of FIG. 4A to FIG. 4D are images including an outline of a palm. However, the registered information and another information for matching may be a data such as a feature amount of the biological body.

When a plurality of images are registered based on images obtained by a biometric sensor, an identical surface reflection region may exist on a plurality of the registered images 1 to 3 if there is not a large difference in a positional relationship between a biological body and the biometric sensor. For example, when a time interval for taking a plurality of images is short, a postural condition (a distance, a position, an angle and so on) of a biological body of a plurality of images tends to be similar to each other. In this case, as illustrated in FIG. 4A to FIG. 4C, the surface reflection regions occur at approximately same position in the registered images 1 to 3. On the other hand, the postural condition during a matching process tends to be different from that during a registering process. As a result, as illustrated in FIG. 4D, the position of the surface reflection region is greatly different from that of the registered images 1 to 3. In this case, the registered images and the image for matching of which position of the surface reflection regions is different from each other are compared with each other. In the surface reflection region, definition of a vein image is degraded in both the registered image and the image for matching. Therefore, a region having a distinct vein image in common with each other is narrow. As a result, even if a user of the registered image is identical to a user of the image for matching, the similarity degree between the registered image and the image for matching may be degraded.

In contrast, in the following embodiments, a surface reflection region is detected when an image is registered. Images having different surface reflection region are registered in advance, by checking an overlapping degree of surface reflection regions of a plurality of registered images. In this case, the authentication accuracy is improved, even if an image where surface reflection regions occur in various positions is obtained as an image for matching.

In concrete, in cases of FIG. 5A to FIG. 5C, the position of the surface reflection region is different from each other among the three registered images 1 to 3. When an image for matching of FIG. 5D is obtained, a matching process is performed between the image for matching and the registered images 1 and 2 of which surface reflection region is different from each other. In this case, high similarity degree may not be obtained. However, the surface reflection regions of the image for matching and the registered image 3 are positioned at approximately same region. In this case, a total region of the surface reflection region gets narrower between the registered image and the image for matching. That is, a region where the surface reflection region does not occur gets larger between the image for matching and the registered image. In this case, a region where a common distinct vein image is obtained gets larger. Therefore, the authentication accuracy gets higher. And, it is not necessary to use an expensive device such as a polarization filter. Therefore, the cost is restrained. Further, a freedom degree of the location of a light source is not limited. Therefore, the device size is restrained. Next, embodiments in accordance with the outline are described.

[a] First Embodiment

Figure 6A:
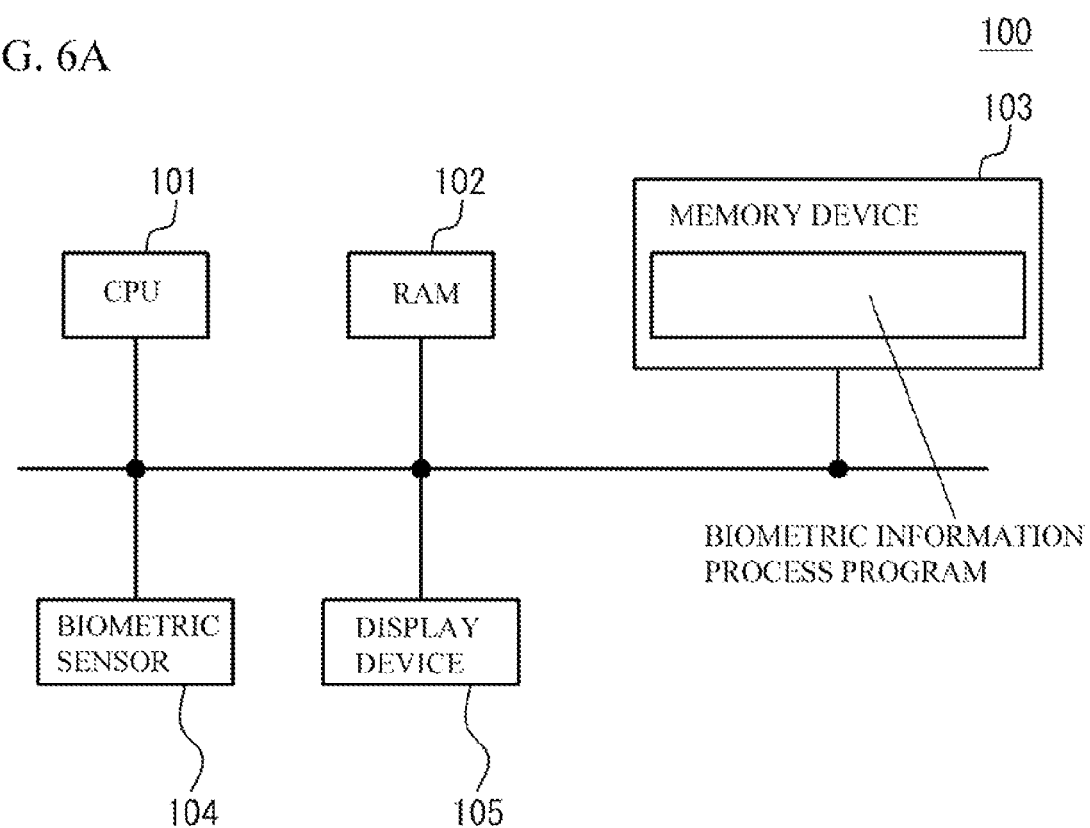
FIG. 6A illustrates a block diagram for describing a hardware structure of a biometric information process device in accordance with a first embodiment.

FIG. 6A illustrates a block diagram for describing a hardware structure of a biometric information process device 100 in accordance with a first embodiment. As illustrated in FIG. 6A, the biometric information process device 100 has a CPU 101, a RAM 102, a memory device 103, a biometric sensor 104, a display device 105 and so on. These components are coupled to each other with a bus or the like.

The CPU 101 is a central processing unit. The CPU 101 includes one or more core. The RAM (Random Access Memory) 102 is a volatile memory temporally storing a program executed by the CPU 101, a data treated by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a biometric information process program. The display device 105 is a device for displaying a result of each process executed by the biometric information process device 100. The display device 105 is, for example, a liquid crystal display.

The biometric sensor 104 is a sensor for obtaining a biometric image of a user, and obtains vein information of a user such as a finger, a palm or the like. As an example, the biometric sensor 104 is an imager device for taking an image of a vein under a palm skin with use of a near-infrared light having high permeability with respect to a human body. The biometric sensor 104 has a CMOS (Complementary Metal Oxide Semiconductor) camera and so on. The biometric sensor 104 may have a light source for emitting a light including the near-infrared light. The biometric sensor 104 may have a distance sensor for obtaining a distance between the biometric sensor 104 and a biological body, an inclination of the biological body, and so on. In the embodiment, the biometric sensor 104 obtains vein information by taking an image of a palm, as an example.

Figure 6B:
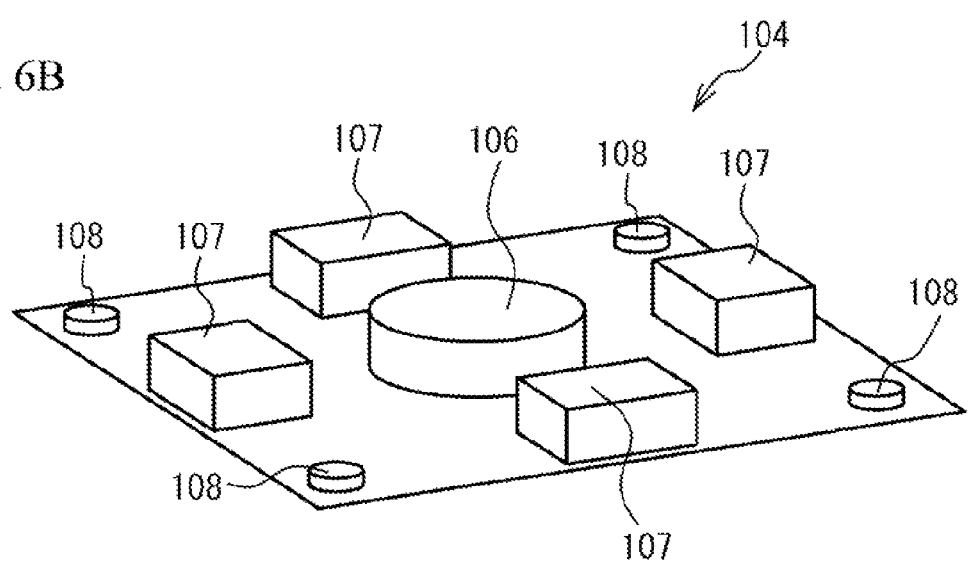
FIG. 6B illustrates a perspective view for describing an example of a biometric sensor.

FIG. 6B illustrates a perspective view for describing an example of the biometric sensor 104. As illustrated in FIG. 6B, the biometric sensor 104 has an imager device 106, a light emitting portion 107, and a distance sensor 108. The imager device 106 is not limited specifically if the imager device 106 can obtain a vein image. The light emitting portion 107 is not limited specifically if the light emitting portion 107 can emit a light including a near-infrared light. The number of the light emitting portion 107 may be more than one. In the example of FIG. 6B, four light emitting portions 107 are arranged so as to surround the imager device 106. The distance sensor 108 is not limited specifically if the distance sensor 108 can obtain a distance to an object. The number of the distance sensor 108 may be more than one. In the example of FIG. 6B, the distance sensor 108 is arranged between each light emitting portion 107.

Next, a description will be given of each process of the biometric information process device 100. The biometric information process program stored in the memory device 103 of the biometric information process device 100 is developed in the RAM 102. The CPU 101 executes the biometric information process program developed in the RAM 102. Thus, each process of the biometric information process device 100 is executed.

Figure 7:
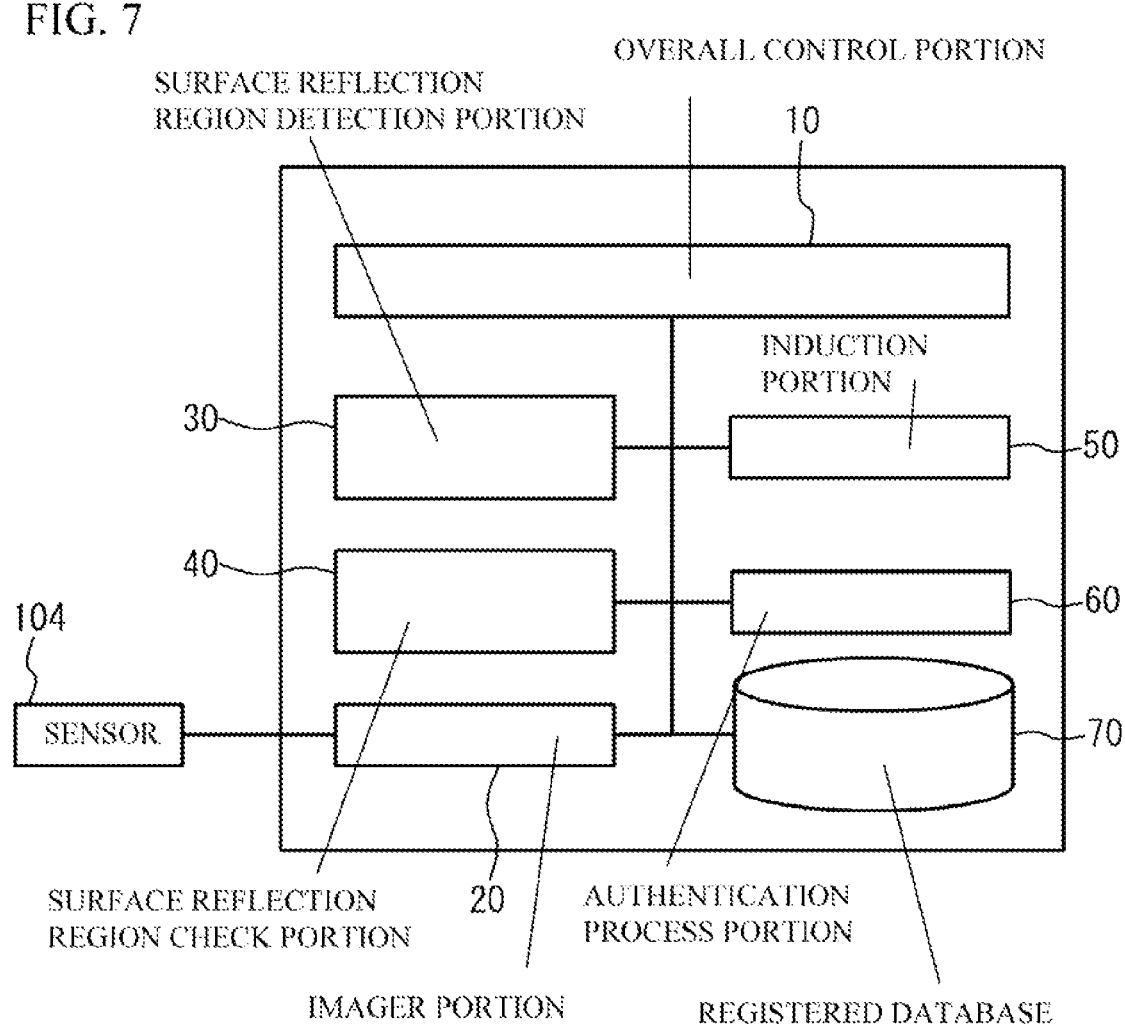
FIG. 7 illustrates a block diagram of each function realized by execution of a biometric information process program.

FIG. 7 illustrates a block diagram of each function realized by the execution of the biometric information process program. As illustrated in FIG. 7, an overall control portion 10, an imager portion 20, a surface reflection region detection portion 30, a surface reflection region check portion 40, an induction portion 50, and an authentication process portion 60 are realized by the execution of the biometric information process program. A registered database 70 is stored in the memory device 103.

The overall control portion 10 controls the imager portion 20, the surface reflection region detection portion 30, the surface reflection region check portion 40, the induction portion 50, and the authentication process portion 60. The imager portion 20 extracts vein information of a palm by obtaining an image of a palm from the biometric sensor 104 in accordance with an instruction of the overall control portion 10. The surface reflection region detection portion 30 detects a surface reflection region from the image of the palm obtained by the biometric sensor 104. The surface reflection region check portion 40 checks a position of the surface reflection region. The induction portion 50 executes a process for inducing a biological body of a user. The authentication process portion 60 executes an authentication process in accordance with an instruction of the overall control portion 10.

In a registering process, a data obtained through a process of the imager portion 20, the surface reflection region detection portion 30, the surface reflection region check portion 40, and the induction portion 50 is registered in the registered database 70 as a registered data. In an authentication process, the authentication process portion 60 matches a date obtained through the process of the authentication process portion 60, the imager portion 20, the surface reflection region detection portion 30 and the surface reflection region check portion 40 (hereinafter referred to as a data for matching) with a registered data registered in the registered database 70. A description will be given of details of the registering process and the authentication process.

[Registering Process]

Figure 8:
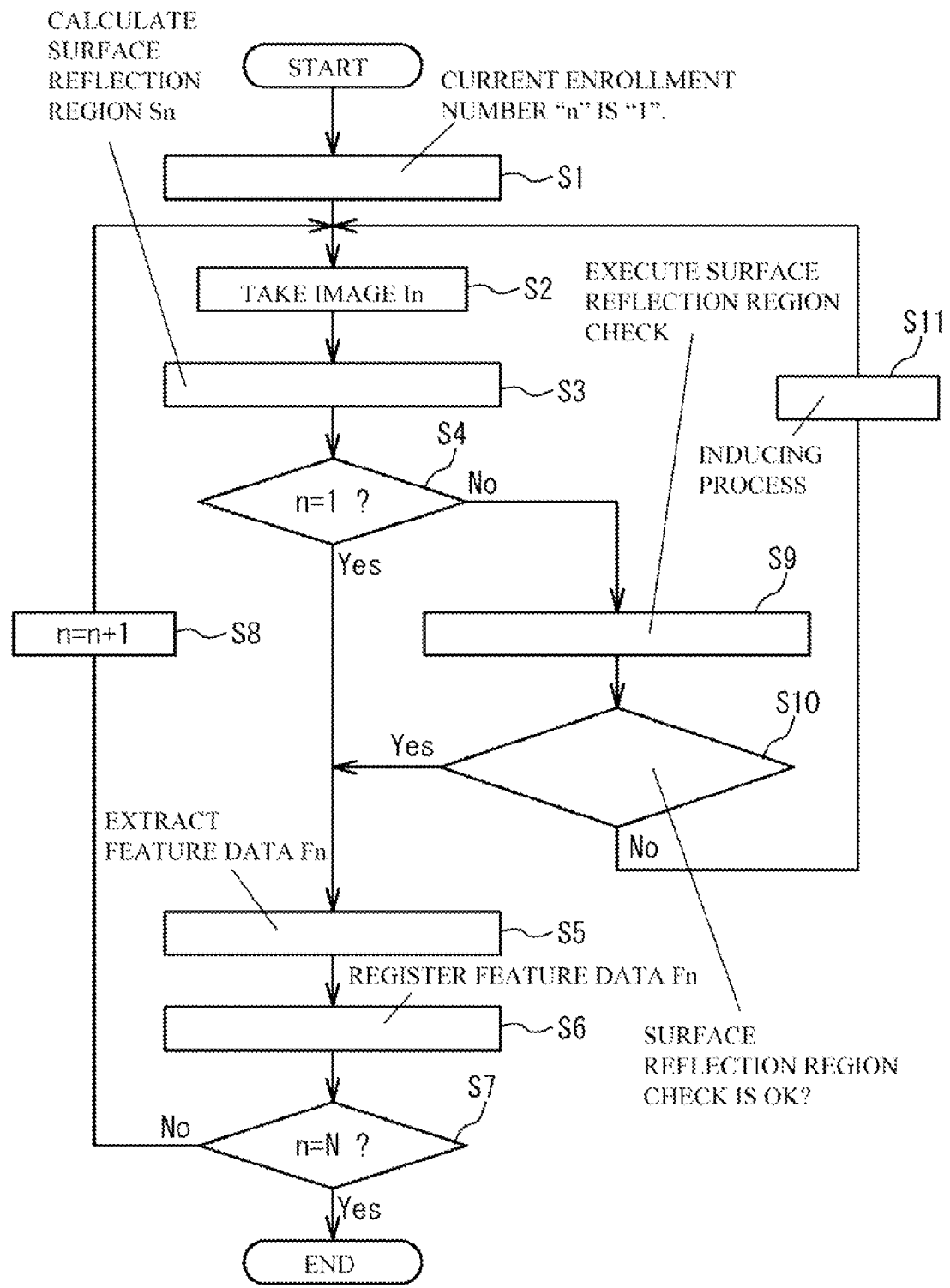
FIG. 8 illustrates an example of a flowchart executed during a registering process.

FIG. 8 illustrates an example of a flowchart executed during the registering process. A description will be given of an example of the registering process with reference to FIG. 8. The overall control portion 10 assigns "1" into a current enrollment number "n" (Step S1). Next, the biometric sensor 104 takes an image In in accordance with an instruction of the imager portion 20 (Step S2). In the embodiment, the image In is a biometric image of which object is a palm. The image In is a biometric image obtained for generating a n-th registered data of an objective user. When obtaining the image, an imaging condition may be set with respect to the object. In concrete, the image may be taken only when a distance to the object, a position of the object, an inclination of the object and so on are within a predetermined range. The distance to the object can be measured with use of the distance sensor 108. The position of the object can be measured with use of the taken image. The inclination of the object can be measured with use of a plurality of the distance sensor 108.

The imager portion 20 detects a palm region from the image In obtained by the biometric sensor 104. In concrete, the imager portion 20 extracts a palm region by binarizing brightness values of the taken palm image with use of a predetermined threshold. In this case, the brightness values may be normalized in order to improve unevenness of a light source. By the normalizing, an overlapped region of surface reflection regions of a plurality of different images can be checked easily.

When normalizing the brightness values, the imager portion 20 obtains an area A of the palm region by applying a labeling process after detecting the palm region by the binarizing. A region of which area A is smaller than a given threshold may be deleted from the process as a noise. The imager portion 20 normalizes the area A of the palm region after extracting the palm region. There are two concrete methods as the normalizing process.

The area A of the palm region may be normalized into a given size $A_0$. Even if a child grows and his hands grows, a vein pattern itself is hardly changed. It is therefore possible to authenticate accurately by normalizing the area A of the palm region into the $A_0$. In concrete, an image is enlarged or downscaled with use of a conversion coefficient $\alpha=\sqrt{(A_0/A)}$ so that the area A of the detected palm region is normalized into the area $A_0$. The coefficient is a positive square root of $(A_0/A)$.

Alternatively, a measured value of the distance sensor 108 may be used, and a taken image may be converted into an image at a predetermined distance. That is, an image data taken in a case where the distance measured by the distance sensor 108 is the distance D is converted into an image taken in a case where the distance is a predetermined distance $D_0$ (for example 5 cm). This can be realized by measuring the conversion coefficient $\alpha$ with respect to a plurality of the distance D in advance. The normalizing allows an easy comparison of an overlaps of the surface reflection regions in spite of an apparent size of the palm based on the difference of the distance. The method has a difficulty in handling the growth of a child. However, the information of the palm size can be applied to the authentication process by converting the distance into the distance D. Therefore, authentication accuracy gets higher. The method is an effective method especially in a case where a user is limited to adults.

A process for correcting the inclination of the palm may be added as one of the normalizing processes. It is therefore possible to check the overlaps of the surface reflection regions more accurately in addition to improving the authentication accuracy, by correcting the inclination. For example, methods disclosed in Japanese Patent Application Publication No. 2007-323667 and Japanese Patent Application Publication No. 2007-010346 may be applied.

Next, the surface reflection region detection portion 30 calculates a surface reflection region Sn included in the image In (Step S3). The surface reflection region Sn is a region where relatively many surface reflection components appear. In the surface reflection region, the brightness value tends to be higher. Many high frequency components tend to be included in the surface reflection region, because of the influence of a wrinkle or the like. Therefore, the surface reflection region may be defined as a region where at least one of a ratio of the high frequency components and the brightness value is larger than a threshold. In the embodiment, as an example, the surface reflection region is defined as a region where both of the ratio of the high frequency components and the brightness are larger than the threshold. And, a set including all small regions Ei determined as the surface reflection region is defined as a surface reflection region S. A surface reflection region of the image In is defined as a surface reflection region Sn.

Figure 9:
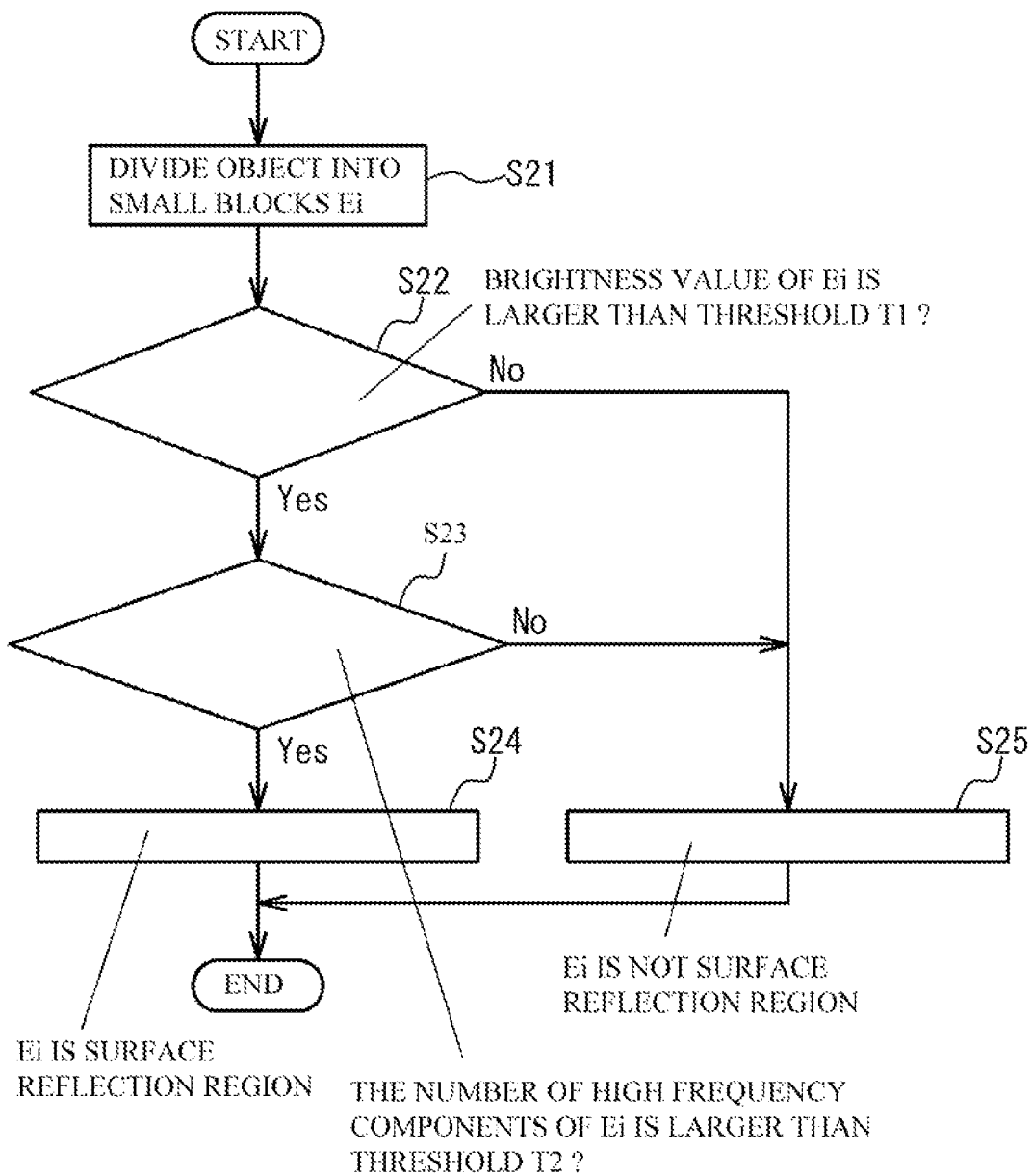
FIG. 9 illustrates a flowchart which a surface reflection region detect portion executes when calculating a surface reflection region.

FIG. 9 illustrates a flowchart which the surface reflection region detection portion 30 executes when calculating the surface reflection region Sn. As illustrated in FIG. 9, the surface reflection region detection portion 30 divides the palm region obtained in the Step S2 into a plurality of small blocks (Step S21). Next, the surface reflection region detection portion 30 determines whether a brightness value of an i-th small block Ei ("i" is an integer from "1" to a division number) is higher than a threshold $T_1$ or not (Step S22). The threshold $T_1$ is a value for determining whether the small block Ei is a surface reflection region or not.

If it is determined as "Yes" in the Step S22, the surface reflection region detection portion 30 determines whether the number of high frequency components of the small block Ei is larger than a threshold $T_2$ or not (Step S23). The threshold $T_2$ is a value for determining whether the small block Ei is a surface reflection region or not. If it is determined as "Yes" in the Step S23, the surface reflection region detection portion 30 determines that the small block Ei is a surface reflection region (Step S24). If it is determined as "No" in the Step S22 or the Step S23, the surface reflection region detection portion 30 determines that the small block Ei is not a surface reflection region. The surface reflection region Sn in the palm region can be detected by executing the Step S22 through the Step S25 with respect to each small block.

With reference to FIG. 8 again, the overall control portion 10 determines whether the enrollment number "n" is "1" or not (Step S4). If it is determined as "Yes" in the Step S4, the imager portion 20 extracts a feature data Fn from the image In (Step S5). In the embodiment, the feature data is a data of the vein pattern of the palm. The feature data Fn is a feature data obtained from the image In.

Next, the imager portion 20 registers the feature data Fn in the registered database 70 (Step S6). Next, the overall control portion 10 determines whether the enrollment number "n" reaches "N" or not (Step S7). If it is determined "Yes" in the Step S7, the flowchart is terminated. If it is determined "No" in the Step S7, the overall control portion 10 increases the value of the enrollment number "n" by one. "N" is a total enrollment number which is set in advance. For example, "N" is 3 or "N" is 5.

An imaging condition may be set according to the distance between the object and the biometric sensor 104, the position of the object with respect to the biometric sensor 104, the inclination of the object with respect to the biometric sensor 104, and so on. The freedom degree may decrease because a surface reflection region check process described later is executed with respect to a second image and other images after the second image. And so, the authentication accuracy may be improved by setting the best condition with respect to the first image $I_1$. Therefore, the imaging condition of the first image $I_1$ may be stricter than the second image or the others after the second image. For example, even if a normal range of the distance is set to be 5 cm plus minus 1 cm, a strict condition of 5 cm plus minus 0.5 cm may be set with respect to the first image.

Figure 10A:
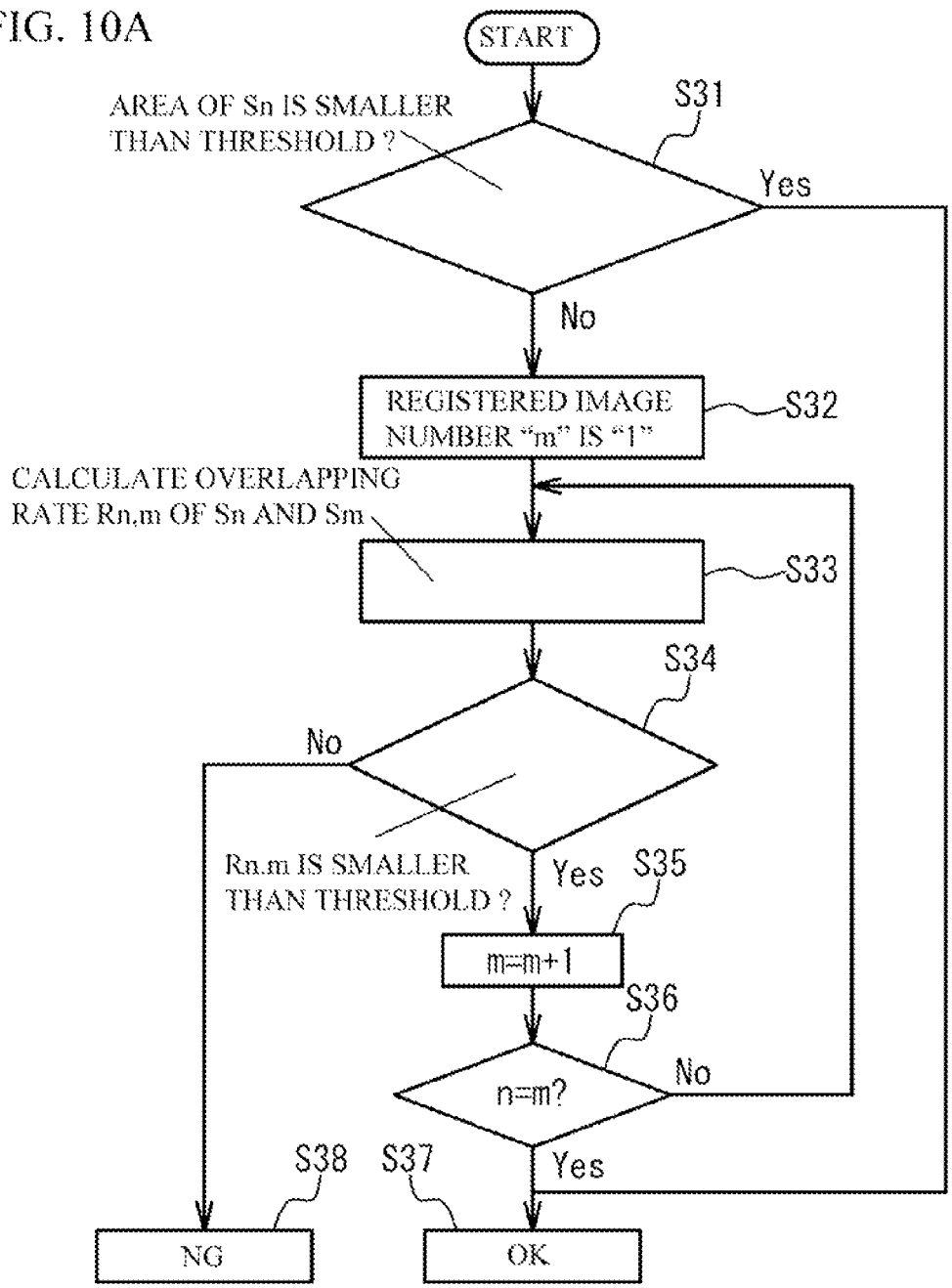
FIG. 10A illustrates an example of a flowchart executed during checking of surface reflection region.

If it is determined as "No" in the Step S4, the surface reflection region check portion 40 checks the surface reflection region Sn (Step S9). FIG. 10A illustrates an example of a flowchart which the surface reflection region check portion 40 executes when the Step S9 is executed. As illustrated in FIG. 10A, the surface reflection region check portion 40 determines whether the surface reflection region Sn is smaller than a threshold or not (Step S31). The threshold is set in order to determine whether the area of the surface reflection region Sn is large or not. This is because, when the influence of the surface reflection on the image In is small, the surface reflection region Sn can be used as a registered data even if a specific process is not executed. If it is determined as "No" in the Step S31, the surface reflection region check portion 40 assigns "1" into a registered image number "m" of a comparison target.

Figure 10B:
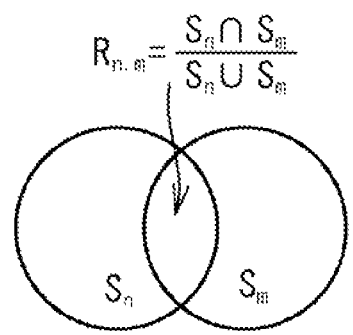
FIG. 10B illustrates an overlapping ratio.

Next, the surface reflection region check portion 40 calculates an overlapping ratio $R_{n,m}$ of the surface reflection region Sn and the surface reflection region Sm (Step S33). As illustrated in FIG. 10B, the overlapping ratio $R_{n,m}$ is a ratio of a product set (Sn∩Sm) of the surface reflection region Sn and the surface reflection region Sm with respect to union of sets (Sn∪Sm). Next, the surface reflection region check portion 40 determines whether the overlapping ratio $R_{n,m}$ is smaller than a threshold (Step S34). The threshold is set in order to make a difference between the position of the surface reflection region Sn and the position of the surface reflection region Sm.

If it is determined "Yes" in the Step S34, the surface reflection region check portion 40 increases the registered image number "m" by one (Step S35). Next, the surface reflection region check portion 40 determines whether the registered image number "m" reaches the enrollment number "n" or not (Step S36). If it is determined "No" in the Step S36, the Step S33 is executed again.

If it is determined "No" in the Step S34, the surface reflection region check portion 40 determines that the check is NG (Step S38). If it is determined "Yes" in the Step S31 or it is determined as "No" in the Step S36, the surface reflection region check portion 40 determines that the check is OK (Step S37).

With reference to FIG. 8 again, the overall control portion 10 determines whether the check of the surface reflection region is OK or not (Step S10). If it is determined as "No" in the Step S10, the induction portion 50 executes an inducing process (Step S11). After the Step S11, the Step S2 is executed.

Figure 11:
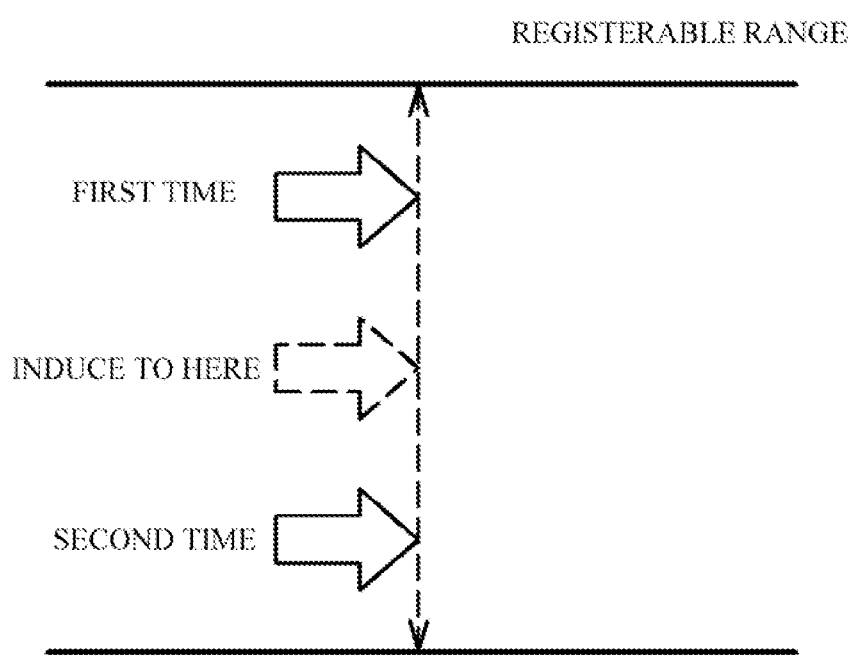
FIG. 11 illustrates an induction of a distance of an object.
Figure 12:
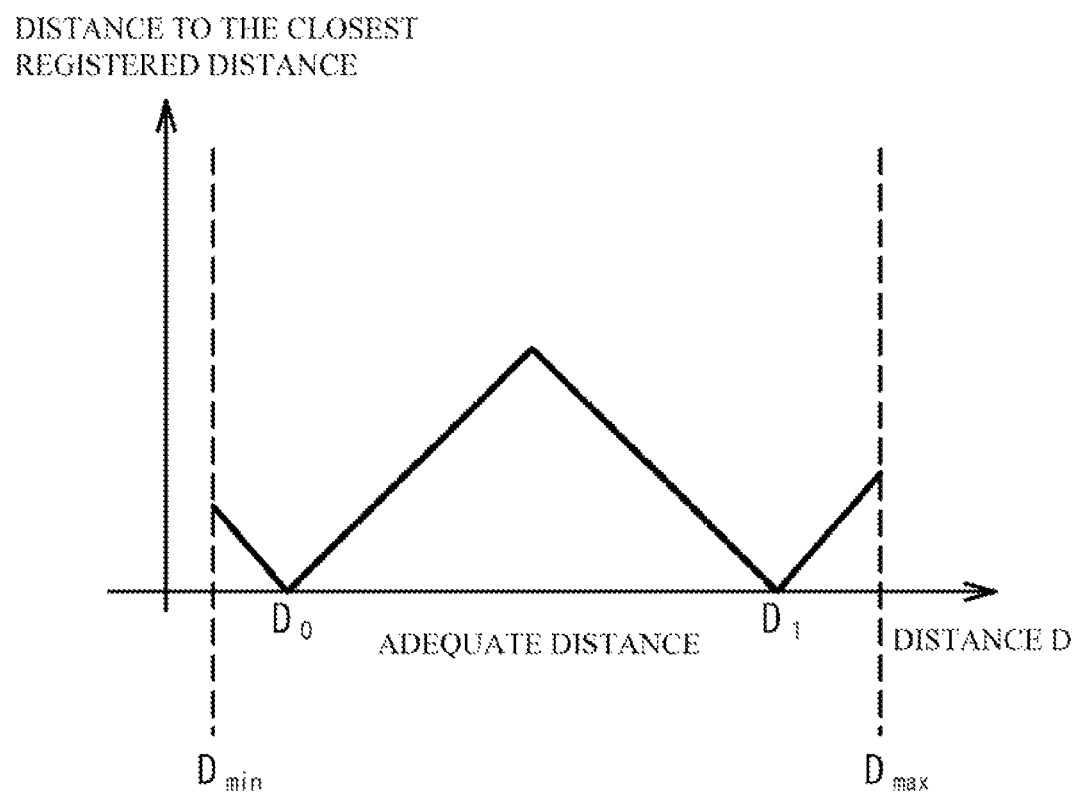
FIG. 12 illustrates an adequate distance of an object.

The induction portion 50 executes an inducing process based on the distance, the position or the like. For example, as illustrated in FIG. 11, the induction portion 50 induces the position of the object so that the distance between the biometric sensor 104 and the object is different from that of the case where the registered data is obtained. For example, when the distance of the case where the registered data is obtained is Di (i=1 . . . (n−1)), the induction portion 50 calculates a minimum value of the distance to the distance Di with respect to the distance (Dmin to Dmax) of a registerable range as illustrated in FIG. 12. In the case of FIG. 12, a position where the minimum value is the largest is an appropriate position to be induced. For example, the Dmin is approximately 4 cm, and the Dmax is appropriately 6 cm.

Figure 13:
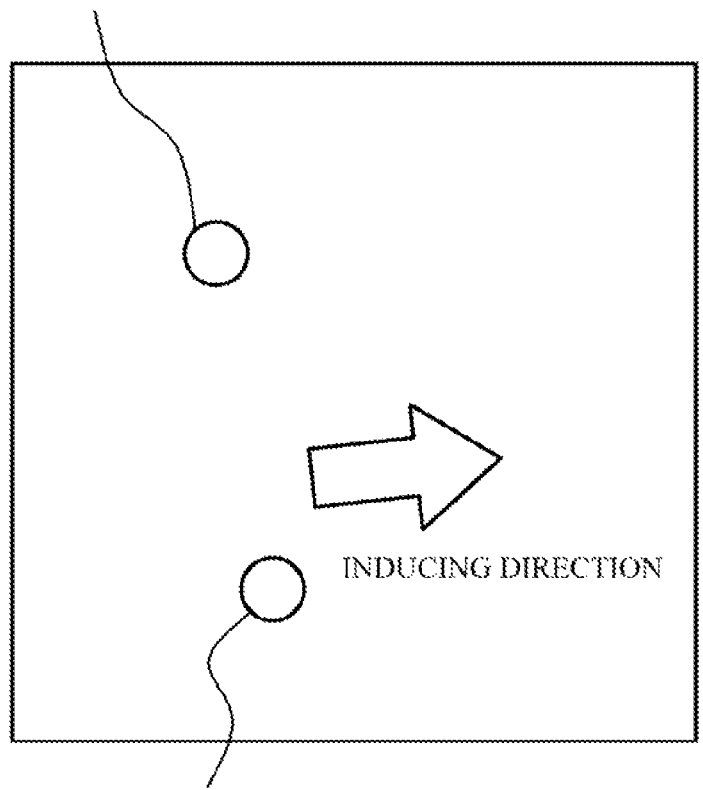
FIG. 13 illustrates an induction of a position of an object.

When inducing the position, the induction portion 50 induces the object to a position that is different from the position where the registered data is obtained, as illustrated in FIG. 13. In concrete, the induction portion 50 stores a center coordinate of the palm region (a gravity center coordinate of the palm region), and executes the inducing process so that center coordinates get away from each other. The induction portion 50 may execute the same process as the inducing process of the distance with respect to a two-dimensional image (coordinate (x, y)), and may determine an inducing direction. The process is a method to which a method is generally named "distance transformation" in an image processing field is applied. The distance transformation is used in the image processing field and is a transformation method in which a background in the distance transformation is replaced by a position in a registered image.

The induction portion 50 induces the user by giving the user a message such as an image or a voice. For example, the induction portion 50 may induce the user by making the display device 105 show an induce position.

It is possible to induce so that the surface reflection region is changed, by changing the inclination of the object with respect to the biometric sensor 104. When it is difficult to induce by giving instruction of the inclination of the object to the user, the distance or the position of the object may be induced priory.

When the inducing of distance is compared to the inducing of the position, the inducing of the distance has a merit that light source distribution with respect to an object is easily equalized. That is, influence of light-dark is restrained according to the distance subjected to the light source. Accordingly, the authentication accuracy may be improved by inducing based on the distance preferentially. The inducing based on the position may be executed when it is determined that position difference of the surface reflection region is not made between the registered image and an obtained image by the inducing based on the distance. The inducing based on the inclination may be executed when it is determined that the position difference of the surface reflection region is not made between the registered image and the obtained image by the inducing based on the position.

FIG. 14 illustrates a table for describing an example of the registered data registered in the registered database 70 through the above-mentioned registering process. As illustrated in FIG. 14, "ID" is information for identifying the registered user. Information such as name or address of the user may be associated to the "ID". "Registration No." is a number added to the registered data in order and corresponds to the enrollment number "n". In FIG. 14, the total enrollment number "N" is 3.

"Registered feature data" is a registered data for the authentication. In the embodiment, the "registered feature data" is a vein pattern where a vein part is extracted from an image obtained by the biometric sensor 104. "Surface reflection region information" is a data of a surface reflection region detected during obtaining of each registered feature data. In concrete, the "surface reflection region information" is a data having "0" or "1" with respect to each small block Ei used for detecting the surface reflection. For example, "1" means the surface reflection region, and "0" means non surface reflection region. The information with respect to each Ei may be assigned to one bit, and the information may be stored by bit unit.

"Distance at registration" is a distance between the biometric sensor 104 and the palm during obtaining the registered feature data. In FIG. 14, the distance is expressed in cm. "Position at registration" is a center coordinate of a palm during obtaining the registered feature data, and is a gravity center of a palm region in concrete. The coordinate is a shift amount from a center of a screen in a case where the center is defined as (0, 0). The "distance at registration" and the "position at registration" can be used for the inducing process of the induction portion 50. The "distance at registration" and the "position at registration" may not be stored in the registered database 70 but may be stored in the RAM 102 temporarily.

An image obtained during the registering process may be determined comprehensively. For example, it may be determined whether the registering process is executed or not according to the overlapping ratio R, the distance D, the position X of an object and an inclination θ of the object. The position X of the object is a center coordinate (a gravity center) of a palm region. The inclination θ of the object is an inclination angle of the object with respect to an upper face of the biometric sensor 104. For example, a registration score Sc expressed by the following equation (1) may be calculated.

$$Sc(n) = a_0 \cdot R + a_1 \cdot \Delta D + a_2 \cdot \Delta X + a_3 \cdot \Delta \theta \quad (1)$$

The "Sc(n)" is a score Sc with respect to the n-th image. The "R" is a ratio of a surface reflection region overlapping with a registered surface reflection region. For example, in the case of n=1, R is 0.0 because there is no registered image with respect to the first image. On the other hand, with respect to the third image, a ratio of registered surface reflection regions $S_1$ and $S_2$ overlapped with a current (n=3) surface reflection region $S_3$ is the "R". In this case, the "R" is expressed as the following equation (2). The registered image is a preferable one when the "R" is smaller.

$$R = S_3 \cap (S_1 \cup S_2) / S_3 \cup (S_1 \cup S_2) \quad (2)$$

The ΔD is an absolute value of a difference between the distance D obtained by the distance sensor 108 and a predetermined distance $D_0$ (a desirable distance). The smaller the ΔD is, the more desirable the registered image is. The ΔX is an amount indicating a distance between a position (coordinate)

X of a palm and an appropriate position of the palm. The smaller the ΔX is, the more desirable the registered image is. Same applies to the Δθ. The Δθ is an amount indicating an absolute value of a difference between the inclination θ of a palm and an appropriate inclination of the palm (for example zero degree). The smaller the Δθ is, the more desirable the registered image is.

The coefficients $a_0$ to $a_3$ of the equation (1) are a weight with respect to the values. Adjusting the value of the coefficients allows an appropriate determination. For example, when the coefficients $a_0$ to $a_3$ are a positive value, it can be determined that the smaller the registration score Sc(n) of the equation (1) is, the more desirable the registered image is.

The concrete value of the coefficients "$a_0$" to "$a_3$" may be set as follows. The coefficients are described so that a term normalizing each value is included, because each value (R, ΔD, ΔX, Δθ) has a different changing range. "R" originally indicates a rate (an overlapping rate of surface reflection regions), and is a normalized value within a range of 0.0 to 1.0. And so, "$a_0$" may be set to be "$W_0$". Here, "$W_0$" is a coefficient indicating important degree of the corresponding parameter. On the other hand, "ΔD" indicates an absolute value indicating a shift amount of the distance. Therefore, with respect to "ΔD", "$a_1$" can be set to be $W_1/D_0$. That is, the coefficient "$W_1$" indicating the important degree is multiplied by the error rate with respect to the distance $D_0$, in the coefficient "$a_1$".

Same applies to the coefficient "$a_2$". "$a_2$" may be set to be $W_2$/Xmax. Here, the "Xmax" is a maximum value of the ΔX. For example, when a resolution of an image is 480 pixels, the "Xmax" is 240. Same applies to the coefficient "$a_3$". "$a_3$" may be set to be $W_3$/θmax. When the unit of the "θ" is degree, the "θ" fluctuates within a range from −180 degrees to +180 degrees. Therefore, the "θmax" is 180 degrees.

"$W_0$" to "$W_3$" are set according to important degree of each parameter with respect to authentication. Therefore, for example, $W_0$, $W_1$, $W_2$ and $W_3$ may be set to be 0.6, 0.1, 0.1, and 0.2 respectively. It is relatively easy to follow the fluctuation of the distance and the position in the authentication. However, it is difficult to follow the surface reflection and the inclination in the authentication. Therefore, in the case, the weight of the surface reflection and the inclination is enlarged. In particular, it is difficult to remove influence of the surface reflection in the image processing. Therefore, the weight of the surface reflection is more enlarged than other parameters.

As an inducing method, a voluntary movement of a palm of a user may be induced, by showing a surface reflection region detected by the surface reflection region detection portion 30 on the display device 105. In this case, a voluntary adjustment of the user may be induced so that a surface reflection region does not appear in a registered surface reflection region, by showing a registered surface reflection region on the display device 105.

[Authentication Process]

Figure 15:
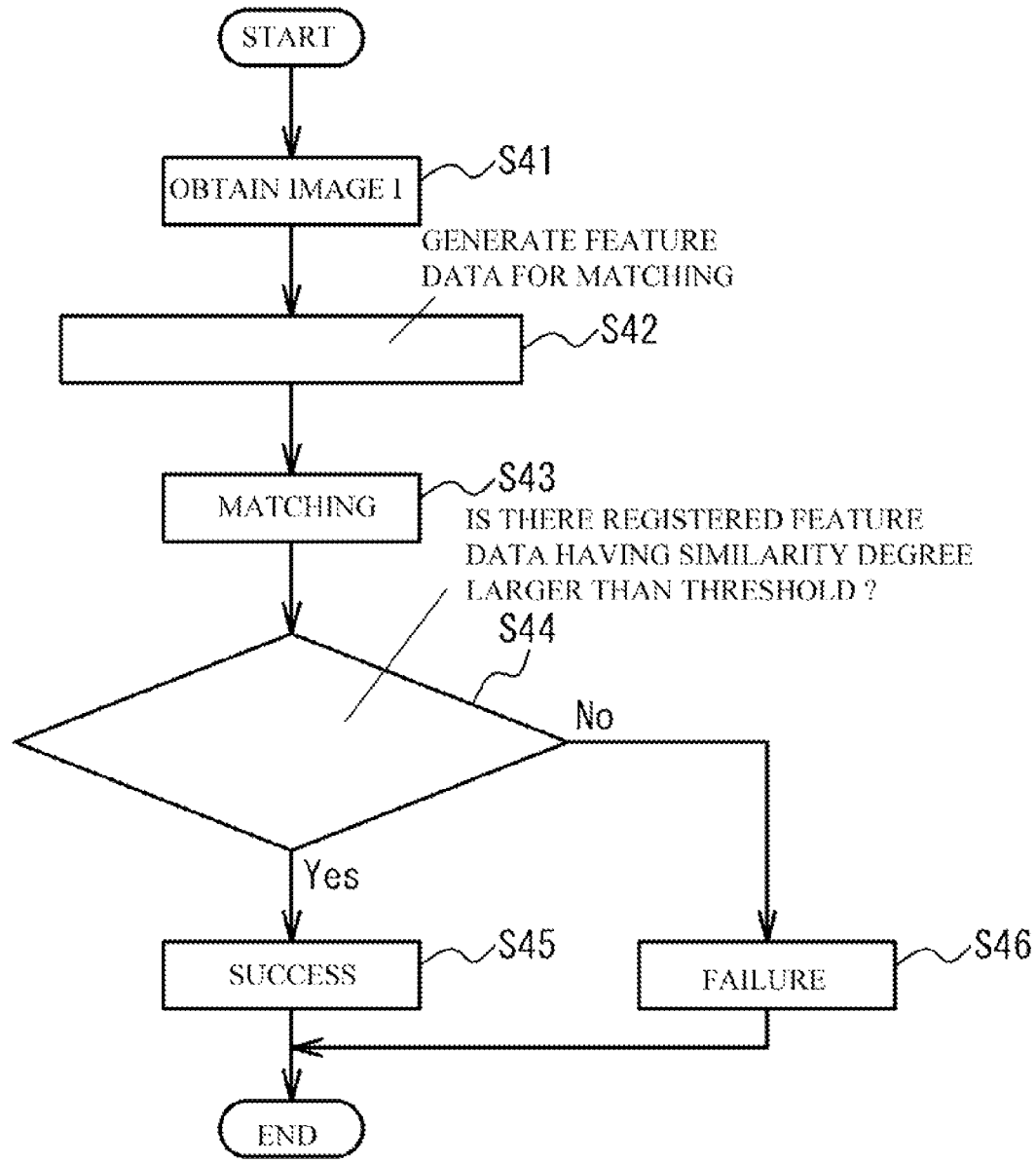
FIG. 15 illustrates a flowchart executed during an authentication process.

FIG. 15 illustrates an example of a flowchart executed for the authentication process. The authentication process is, for example, executed for a BIOS authentication at a starting of a PC, a login authentication of an OS, and so on. The biometric sensor 104 takes an image I for authentication in accordance with an instruction of the imager portion 20 (Step S41). Next, the imager portion 20 generates a feature data for matching from the image I (Step S42). Here, the feature data for matching can be generated by extracting a feature amount (a vein pattern or the like) relating to a vein from the image I.

Next, the authentication process portion 60 matches the feature data for matching and the registered feature data registered in the registered database 70 (Step S43). Next, the authentication process portion 60 calculates a similarity degree between the feature data for matching and the each registered feature data. In this case, the authentication process portion 60 selects more than one registered feature data and calculates the similarity degree. In the embodiment, a similarity degree (coincidence degree) of the vein pattern is calculated. Next, the authentication process portion 60 determines whether a registered feature data of which calculated similarity degree is a predetermined threshold or more is found or not (Step S44). If it is determined as "Yes" in the Step S44, the authentication process portion 60 determines that the user subjected to the authentication is a user of the registered feature data (the authentication is succeeded), and outputs the determination result (Step S45). If it is determined as "No" in the Step S44, the authentication process portion 60 outputs a result relating to a failure of the authentication (Step S46).

It is possible to improve the authentication accuracy by selecting a registered feature data of which surface reflection region is similar to that of an image detected for matching obtained during the matching process, and calculating the similarity degree between the registered feature data and the feature data for matching preferentially. The similarity degree or reliability of the similarity degree may be adjusted according to an overlapping ratio of the surface reflection regions. In this way, the authentication accuracy is improved. For example, a similarity degree Sim(n) that is a matching result with respect to a n-th registered template is taken into consideration. A surface reflection region of an image obtained for matching is referred to as "$S_f$". A surface reflection region of the n-th registered template is referred to as "Sn". In this case, the following $R_f(N)$ is calculated.

$$R_f(n)=(S_f \cap Sn)/(S_f \cup Sn) \qquad (3)$$

The $R_f(n)$ is an amount indicating a common degree between the surface reflection region of the n-th registered feature data and that of the feature data for matching. When the $R_f(n)$ is large, it can be determined that the reliability of the similarity degree is high. The calculated similarity degree Sim(n) may be corrected with use of the result. Here, "f(x)" is a function for correcting. For example, the "f(x)" may be "x".

$$Sim(n)'=Sim(n) \times f(R_f(n)) \qquad (4)$$

A block matching may be applied to the above-mentioned matching process. The block matching is a method of dividing a registered feature data and a feature data for matching into a plurality of spatial blocks and matching by a block unit. There is a merit of following a small deformation of a palm with the block matching by the block unit. For example, in a case where a region near a base of a thumb slightly moves in parallel because of the difference of extending of the thumb, overall parallel movement of the palm hardly absorbs. However, it is possible to absorb as the parallel movement of the blocks through the division.

In the case of the block matching, the authentication can be performed by determining whether a rate of blocks of which similarity degree is more than a predetermined threshold is more than another predetermined threshold or not. Alternatively, only values having a higher similarity degree of all blocks may be used for determination. For example, only half of values having a higher similarity degree of all blocks may be used, and an average value or a median value of the similarity degrees of the higher half of values may be used for the determination process. In this case, for example, a matching process can be performed without regions of a registered image and an image for matching of which correspondence is difficult because of a difference of opening of fingers and so on.

In the embodiment, a plurality of images of which surface reflection regions do not overlap with each other are registered, and a probability for matching is improved under a condition where there are many overlaps between an image for matching and a registered image. In this case, when the above-mentioned block matching is applied and only half of values having a higher similarity degree are used, blocks having surface reflection region are not used for the determination, and only preferable regions without surface reflection region can be used for the determination. It is therefore possible to improve the authentication accuracy by applying the block matching to the embodiment.

The registered data of FIG. 14 is applied to one to many identification. However, the data may be applied to one to one authentication. The one to many identification is an authentication method for identifying a user from registered N users. The one to one authentication is an authentication method in which a user is specified with use of an ID card in advance and the authentication is performed. Therefore, the one to one authentication is an authentication method for determining whether one registered user corresponds to a user subjected to the authentication or not.

In the above-mentioned embodiments, a palm is used as an object. However, an image of another object such as a finger may be taken, and a vein pattern under a skin of the object may be extracted as biometric information. In the above-mentioned embodiments, a vein pattern is used as a biological body. However, another biological body where a surface reflection component appears as a noise may be applied to the above-mentioned embodiments. For example, a face, an iris and so on may be used as the biometric information.

In the above-mentioned embodiments, the surface reflection region detection portion 30 acts as a detection portion for detecting a surface reflection region of a plurality of biometric images. The surface reflection region check portion 40 and the registered database 70 act as a storage portion for storing the biometric information obtained from biometric images of which surface reflection region is different from each other. The authentication process portion 60 acts as a selection portion and acts as a matching portion.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric information process device comprising:
a biometric sensor to obtain a plurality of biometric images of an identical instance of an identical user;
a detector to detect each of first regions from each of the plurality of biometric images based on a first threshold of a brightness value or a high frequency wave component and detect each of second regions of which brightness value is larger than a second threshold from each of the first regions as each of surface reflection regions of biometric images; and
a storage to store biometric information obtained from each of the biometric images corresponding to the identical instance of the identical user, the biometric images having different surface reflection regions each of which is located in a different location in the biometric images from each other.

2. The biometric information process device as claimed in claim 1, wherein the detector divides one of the plurality of biometric images into a plurality of regions and detects whether each of the plurality of regions are a surface reflection region.

3. The biometric information process device as claimed in claim 1, further comprising:
a calculator to calculate an overlapping ratio of the surface reflection regions detected by the detector with respect to the biometric images,
wherein the storage stores the biometric information of the biometric images when the overlapping ratio calculated by the calculator is a predetermined value or less.

4. The biometric information process device as claimed in claim 3, further comprising:
a guider to guide a biological body of a user when the biometric sensor obtains biometric images and the overlapping ratio calculated by the calculator is a predetermined value or more.

5. The biometric information process device as claimed in claim 4, wherein the guider guides at least a position of the biological body, a distance between the biological body and the biometric sensor, and an inclination of the biological body with respect to the biometric sensor.

6. The biometric information process device as claimed in claim 4, wherein:
the storage stores the surface reflection region; and
the guider has a display device to display the surface reflection region stored in the storage when inducing the biological body.

7. The biometric information process device as claimed in claim 1, further comprising:
a selector to select one or more of biometric information of the biometric images stored in the storage; and
a matcher to match the biometric information selected by the selector with biometric information for authentication of a biometric image for authentication of a user subjected to authentication obtained by the biometric sensor.

8. The biometric information process device as claimed in claim 7, wherein:
the storage stores a plurality of biometric information by associating the plurality of biometric information with a surface reflection region; and
the selector selects the biometric information according to the overlapping ratio between the surface reflection region of the biometric information for authentication and the surface reflection region stored in the storage.

9. The biometric information process device as claimed in claim 8, wherein the matcher uses the overlapping ratio between the surface reflection region of the biometric information for matching and the surface reflection region stored in the storage during matching.

10. The biometric information process device as claimed in claim 7, wherein the matcher divides the biometric information selected by the selector and the biometric information for authentication into blocks, and matches with respect to each of the blocks during matching.

11. The biometric information process device as claimed in claim 1, wherein the biometric information is a vein pattern.

12. The biometric information process device as claimed in claim 1 further comprising:
a priority order calculator to calculate a priority order of each of the biometric information stored in the storage, based on a similarity between a location of each of the biometric information stored in the storage and a location of biometric information for authentication of a biometric image for authentication of a user subjected to authentication obtained by the biometric sensor.

13. A biometric information process method comprising:
obtaining a plurality of biometric images of an identical instance of an identical user with a biometric sensor;
detecting each of first regions from each of the plurality of biometric images based on a first threshold of a brightness value or a high frequency wave component and detecting each of second regions of which brightness value is larger than a second threshold from each of the first regions as each of surface reflection regions of biometric images; and
storing biometric information obtained from each of the biometric images corresponding to the identical instance of the identical user, the biometric images having different surface reflection regions each of which if located in a different location in the biometric images from each other.

14. The method as claimed in claim 13 further comprising:
calculating a priority order of each of the biometric information stored in the storage, based on a similarity between a location of each of the biometric information stored in the storage and a location of biometric information for authentication of a biometric image for authentication of a user subjected to authentication obtained by the biometric sensor.

15. A computer readable, non-transitory medium storing a program that causes a computer to execute a process, the process comprising:
obtaining a plurality of biometric images of an identical instance of an identical user with a biometric sensor;
detecting each of first regions from each of the plurality of biometric images based on a first threshold of a brightness value or a high frequency wave component and detecting each of second regions of which brightness value is larger than a second threshold from each of the first regions as each of surface reflection regions of biometric images; and
storing biometric information obtained from each of the biometric images corresponding to the identical instance of the identical user, the biometric images having different surface reflection regions each of which if located in a different location in the biometric images from each other.

16. The medium as claimed in claim 15, wherein the process further comprises:
calculating a priority order of each of the biometric information stored in the storage, based on a similarity between a location of each of the biometric information stored in the storage and a location of biometric information for authentication of a biometric image for authentication of a user subjected to authentication obtained by the biometric sensor.

* * * * *